(12) United States Patent
Patton

(10) Patent No.: US 9,702,517 B2
(45) Date of Patent: Jul. 11, 2017

(54) MULTI-FLAME ELECTRIC CANDLES

(71) Applicant: Luminara Worldwide, LLC, Eden Prairie, MN (US)

(72) Inventor: Douglas Patton, Irvine, CA (US)

(73) Assignee: Luminara Worldwide, LLC, Eden Prairie, MN (US)

( * ) Notice: Subject to any disclaimer, the term of this patent is extended or adjusted under 35 U.S.C. 154(b) by 0 days.

(21) Appl. No.: 15/136,200

(22) Filed: Apr. 22, 2016

(65) Prior Publication Data

US 2016/0312969 A1     Oct. 27, 2016

Related U.S. Application Data

(63) Continuation-in-part of application No. PCT/US2014/062059, filed on Oct. 23, 2014.

(60) Provisional application No. 61/894,900, filed on Oct. 23, 2013.

(51) Int. Cl.

| | |
|---|---|
| F21V 7/04 | (2006.01) |
| F21S 10/04 | (2006.01) |
| F21S 6/00 | (2006.01) |
| F21V 23/04 | (2006.01) |
| H05B 33/08 | (2006.01) |
| F21V 5/04 | (2006.01) |
| H05B 37/02 | (2006.01) |
| F21Y 115/10 | (2016.01) |

(52) U.S. Cl.
CPC ............ *F21S 10/043* (2013.01); *F21S 6/001* (2013.01); *F21S 10/046* (2013.01); *F21V 5/04* (2013.01); *F21V 23/0435* (2013.01); *H05B 33/0854* (2013.01); *H05B 33/0857* (2013.01); *H05B 33/0872* (2013.01); *H05B 37/0227* (2013.01); *H05B 37/0272* (2013.01); *H05B 37/0281* (2013.01); *F21Y 2115/10* (2016.08)

(58) Field of Classification Search
CPC ................................. F21V 35/00; F21S 6/001
USPC .............. 315/185 S; 362/392, 393, 569, 565
See application file for complete search history.

(56) References Cited

U.S. PATENT DOCUMENTS

| | | | |
|---|---|---|---|
| 6,491,516 B1 * | 12/2002 | Tal | .................. A47G 33/00 273/147 |
| 7,159,994 B2 | 1/2007 | Schnuckle et al. | |
| 7,261,455 B2 | 8/2007 | Schnuckle et al. | |
| 7,837,355 B2 | 11/2010 | Schnuckle | |
| 8,070,319 B2 | 12/2011 | Schnuckle et al. | |
| 8,132,936 B2 | 3/2012 | Schnuckle et al. | |
| 8,342,712 B2 | 1/2013 | Patton et al. | |
| 8,534,869 B2 | 9/2013 | Patton et al. | |

(Continued)

FOREIGN PATENT DOCUMENTS

| | | |
|---|---|---|
| CA | 2772728 A1 | 4/2010 |
| CA | 2779978 A1 | 1/2012 |

(Continued)

*Primary Examiner* — Minh D A
(74) *Attorney, Agent, or Firm* — Fish & Tsang LLP

(57) ABSTRACT

Various embodiments of electric candles are described having multiple flame elements, each of which generate a flickering flame effect, and collectively simulate a candle having multiple flames. The candles include a housing that encloses various lighting devices and circuitry that can control one or more aspects of the lighting devices. The enclosure can also house one or more drive mechanisms that help to effect movement of the flame elements (e.g., pivot or wobble) relative to the enclosure.

13 Claims, 15 Drawing Sheets

(56) References Cited

U.S. PATENT DOCUMENTS

| | | |
|---|---|---|
| 8,550,660 B2 | 10/2013 | Patton et al. |
| 8,646,946 B2 | 2/2014 | Schnuckle et al. |
| 8,696,166 B2 | 4/2014 | Patton et al. |
| 8,721,118 B2 | 5/2014 | Patton et al. |
| 8,727,569 B2 | 5/2014 | Schnuckle et al. |
| 8,789,986 B2 | 7/2014 | Li |
| 8,926,137 B2 | 1/2015 | Li |
| 9,052,078 B2 | 6/2015 | Sheng |
| 2001/0033488 A1 | 10/2001 | Chliwnyj |
| 2004/0196658 A1 | 10/2004 | Fung |
| 2005/0169666 A1* | 8/2005 | Porchia ............. A01M 1/02 399/111 |
| 2006/0034079 A1 | 2/2006 | Schnuckle et al. |
| 2006/0034100 A1 | 2/2006 | Schnuckle et al. |
| 2010/0079999 A1 | 4/2010 | Schnuckle |
| 2010/0124050 A1* | 5/2010 | Hau ............. F21S 6/001 362/183 |
| 2011/0019422 A1 | 1/2011 | Schnuckle et al. |
| 2011/0074297 A1 | 3/2011 | Gutstein et al. |
| 2011/0110073 A1 | 5/2011 | Schnuckle et al. |
| 2011/0127914 A1 | 6/2011 | Patton et al. |
| 2011/0255272 A1 | 10/2011 | Privas |
| 2012/0093491 A1* | 4/2012 | Browder ............. A61L 9/015 392/390 |
| 2012/0134157 A1 | 5/2012 | Li |
| 2013/0148353 A1 | 6/2013 | Patton et al. |
| 2014/0177212 A1 | 6/2014 | Li |
| 2014/0211471 A1 | 7/2014 | Gaumann |
| 2014/0218929 A1 | 8/2014 | Schnuckle et al. |
| 2015/0109786 A1 | 4/2015 | Li |
| 2015/0285453 A1 | 10/2015 | Schnuckle et al. |
| 2015/0292698 A1 | 10/2015 | Schnuckle et al. |

FOREIGN PATENT DOCUMENTS

| | | |
|---|---|---|
| CA | 2886665 A1 | 1/2012 |
| CN | 101865413 A | 10/2010 |
| CN | 201724143 U | 1/2011 |
| CN | 101918755 B | 8/2012 |
| CN | 102721002 A | 10/2012 |
| CN | 102734740 A | 10/2012 |
| CN | 103047604 A | 4/2013 |
| EP | 2546571 A1 | 1/2013 |
| EP | 2232128 B1 | 2/2013 |
| EP | 2587127 A1 | 5/2013 |
| JP | 2012504310 A | 2/2012 |
| KR | 10-2010-0128775 A | 12/2010 |
| WO | 2006/020839 A2 | 2/2006 |
| WO | 2010/039347 A1 | 4/2010 |
| WO | 2012/000418 A1 | 1/2012 |

* cited by examiner

FIG. 1A
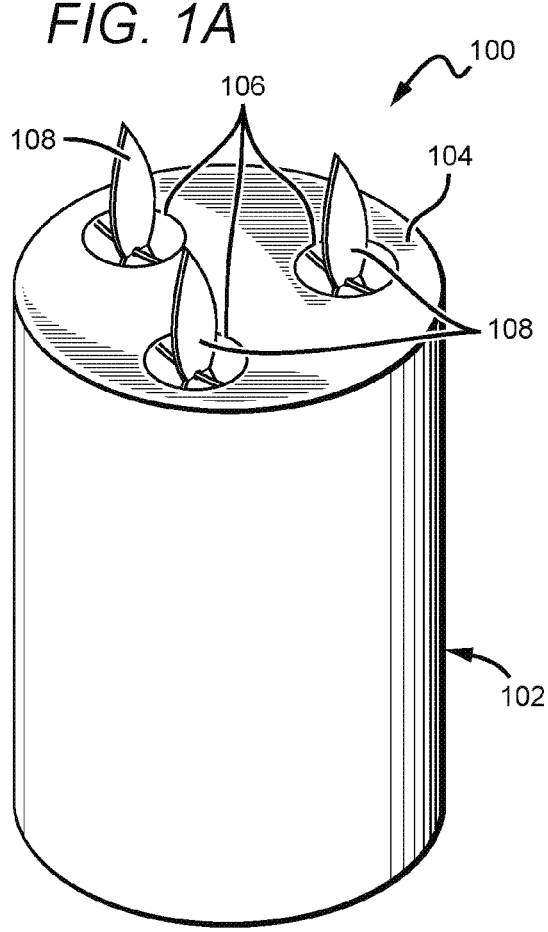
FIG. 1B
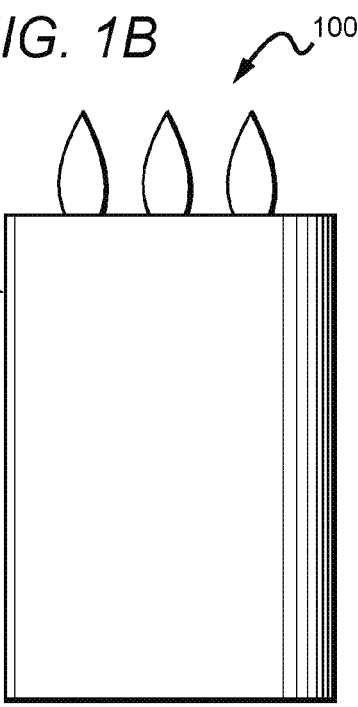
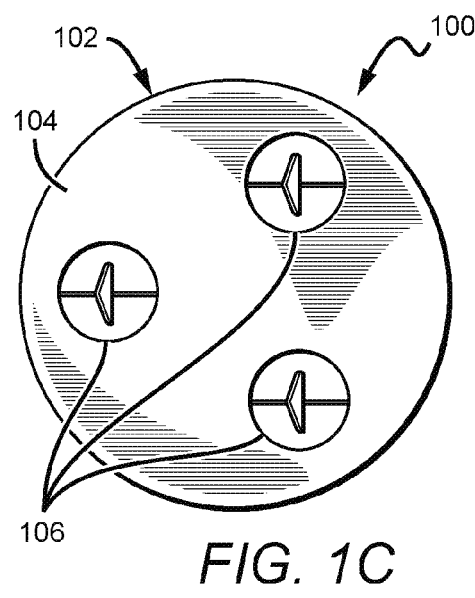
FIG. 1C

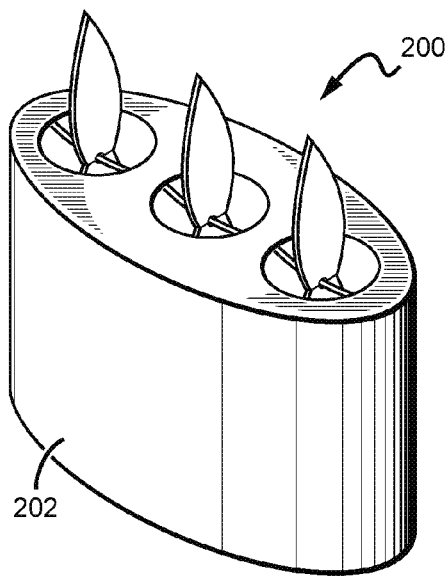
FIG. 2A
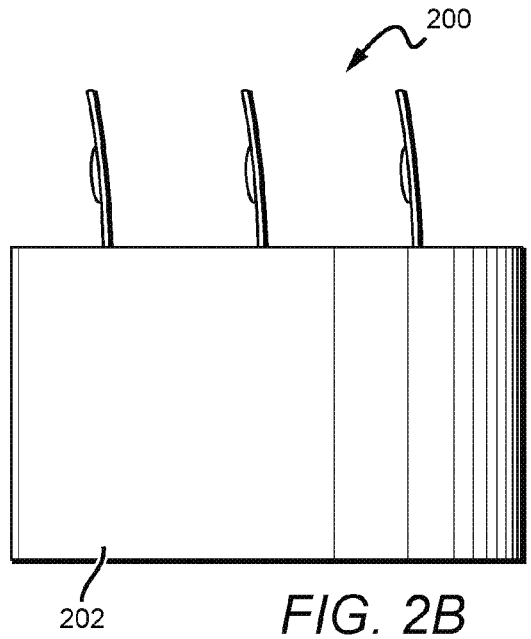
FIG. 2B
FIG. 2C
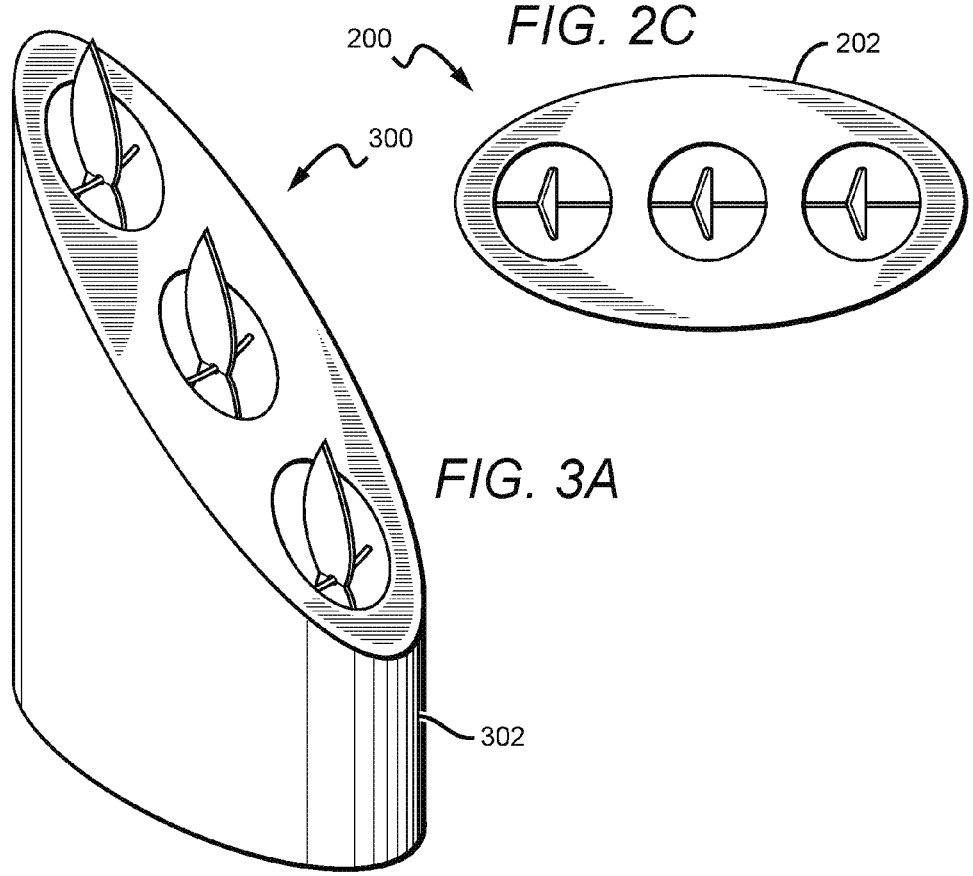
FIG. 3A

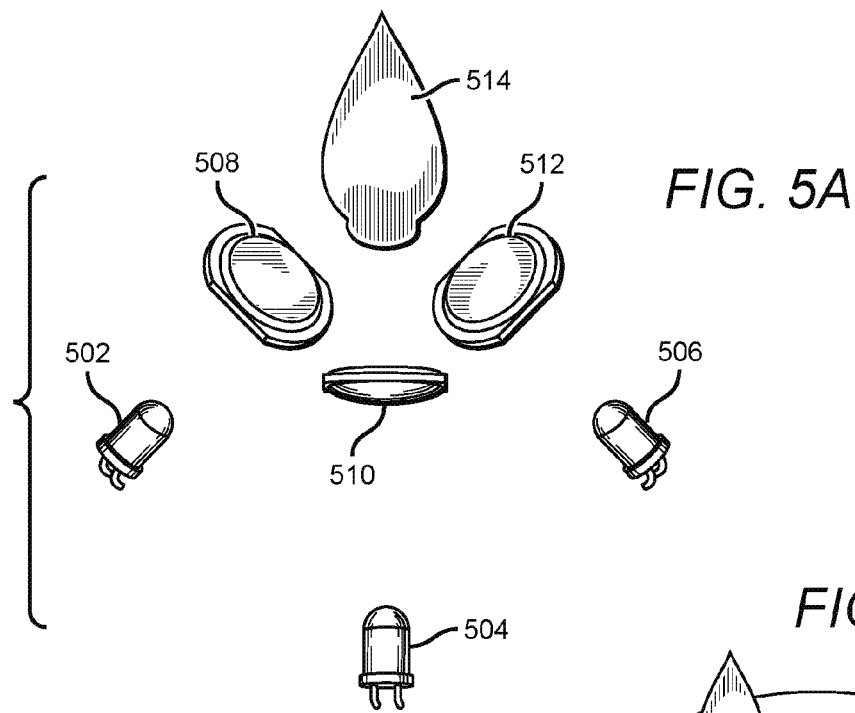
FIG. 5A
FIG. 5B
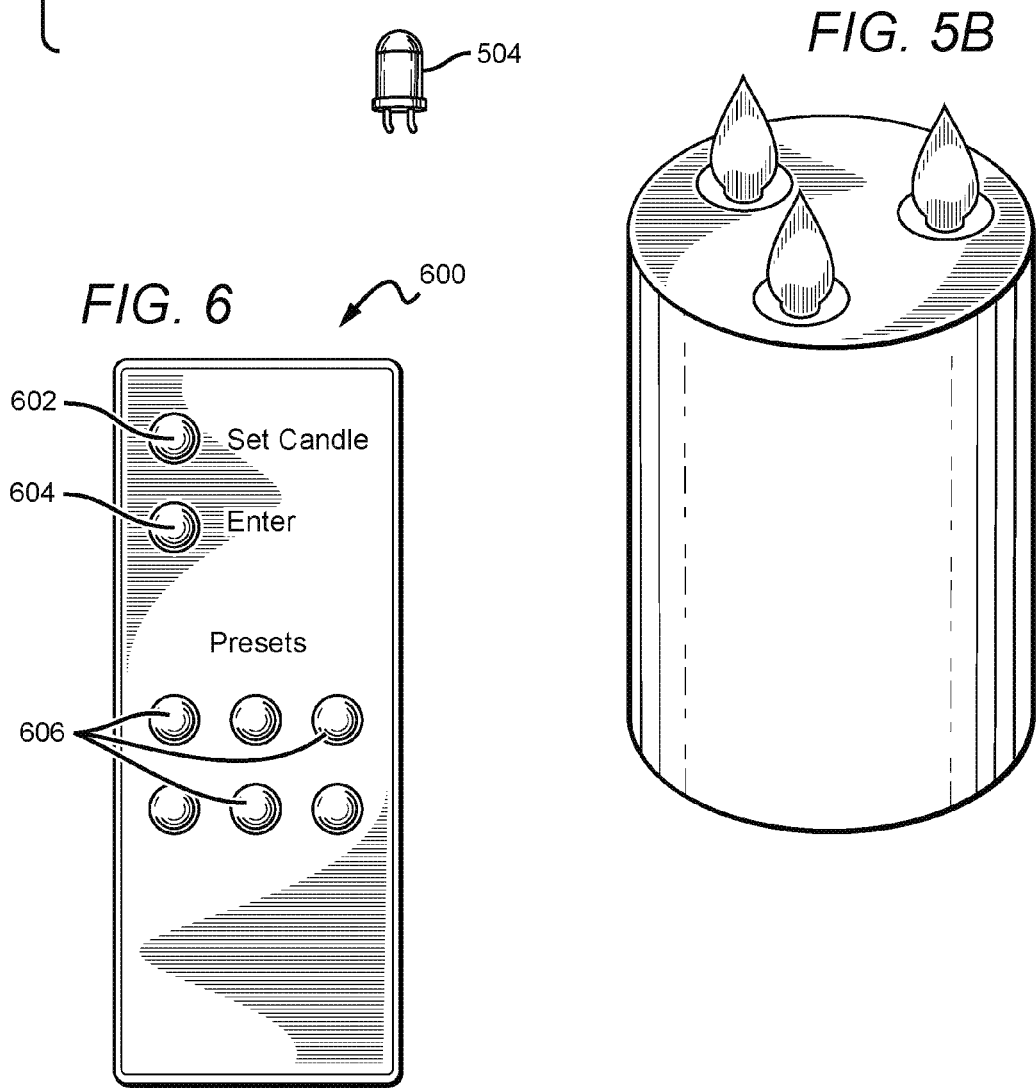
FIG. 6

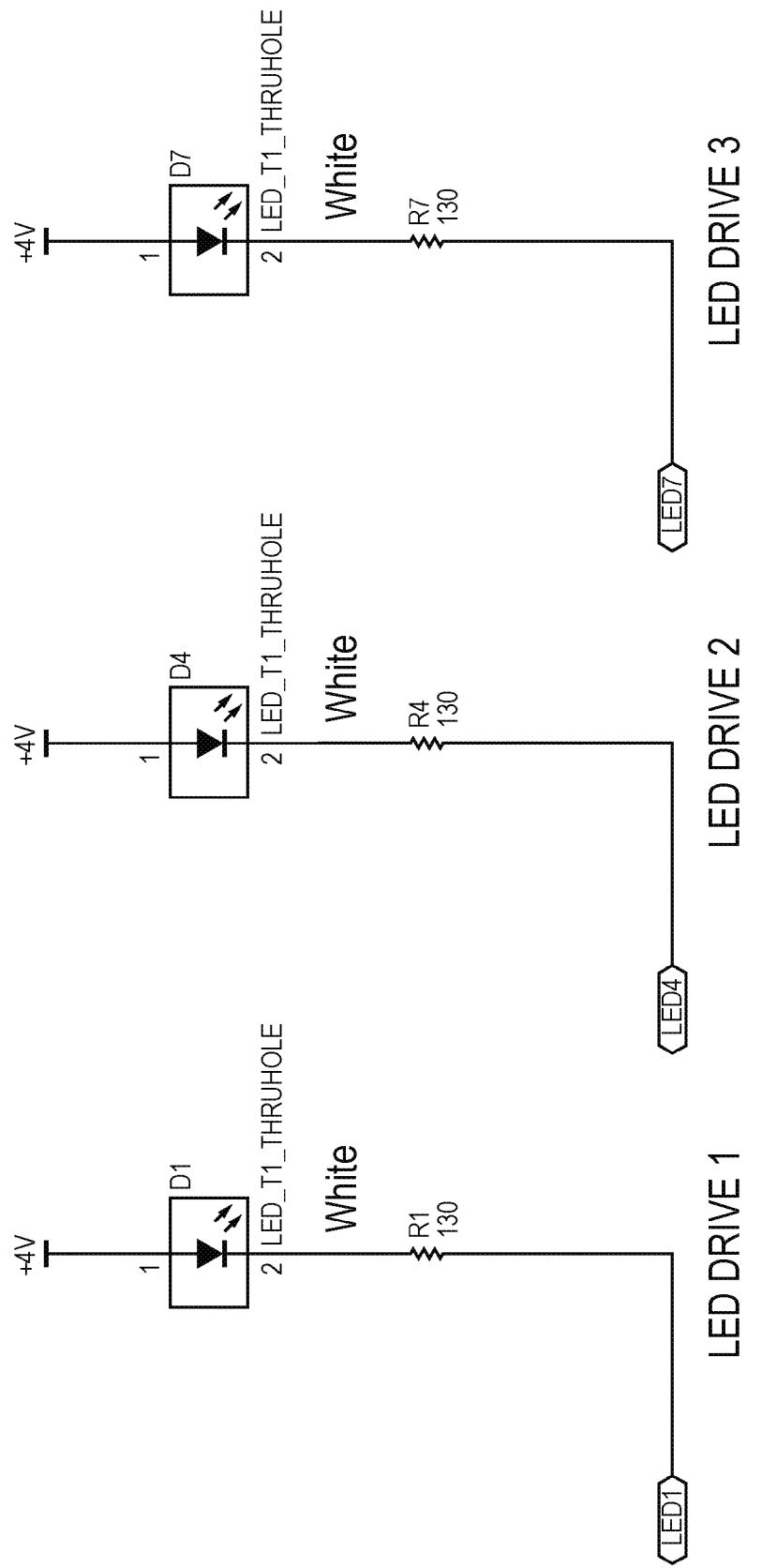

MULTI-FLAME ELECTRIC CANDLES

This application is a continuation in part of PCT/US14/62059, filed Oct. 23, 2016, which claims priority to U.S. Provisional Application No. 61/894,900, filed Oct. 23, 2013. All extrinsic materials identified herein are incorporated by reference in their entirety.

FIELD OF THE INVENTION

The field of the invention is multi-flame electric candles.

BACKGROUND

The background description includes information that may be useful in understanding the present invention. It is not an admission that any of the information provided herein is prior art or relevant to the presently claimed invention, or that any publication specifically or implicitly referenced is prior art.

Electric candles have existed for a number of years, but current products and designs still leave room for improvement. For example, some electric candles project light onto a flame element to create the illusion of a real candle flame. See U.S. Pat. No. 8,132,936. Others have made efforts to create electric candles that project different colors. For example, in U.S. pat. publ. no. 20140211471 to Gaumann, an electric candle with a single light source is described as using different colors for that light source. However, these devices fail to appreciate the many advantages gained, and the technical knowledge required, by increasing the number of "flames".

Previous efforts to improve electric candles failed to overcome the challenges of coordinating the movement of flame elements with the projection of light in one or more electric candles, and thereby failed to capture the benefits associated therewith.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for electric candles having multiple flame elements, where movement or lighting effects for each of the flame elements are coordinated.

SUMMARY OF THE INVENTION

The inventive subject matter provides apparatus, systems and methods of a multi-flame electric light, preferably styled as an electric candle that simulates a flickering flame effect of a lighted, traditional candle with a wick. Various objects, features, aspects and advantages of the inventive subject matter will become more apparent from the following detailed description of preferred embodiments, along with the accompanying drawing figures in which like numerals represent like components.

In one aspect of the inventive subject matter, a multi-flamed electric candle includes (i) an enclosure, (ii) at least two, and preferably three or more, flame elements protruding out from the top of the enclosure via separate apertures, (iii) at least two light sources, and (iv) related circuitry to control one or more aspects of the light sources including, for example, brightness, color, and so forth, or a drive mechanism configured to cause movement of one or more of the flame elements.

The enclosure preferably houses all of the above components and associated hardware of the electric candle. To generate a flame-like effect, the light sources are preferably positioned and oriented within the enclosure such that each light source projects light upwardly toward one or more of the flame elements through the apertures or a separate aperture. The circuitry can be used to control the characteristics of the light sources, preferably via one or more stored programs, where a program defines how and which light sources are to be activated over a specified time period.

To allow the flame elements to pivot relative to the enclosure, in preferred embodiments the flame elements are supported within the enclosure such that the flame elements can move with respect to the enclosure. As just one example, each flame element can have a hole in a middle portion through which a support wire or other mount can be inserted. As another example, the flame element could be supported by a cantilevered rod passing through a hole in its middle portion. Preferably, the mount for the flame element does not interfere with light projected toward the flame elements from the various light sources. As but another example, the flame element can be supported by an arm extending from an internal housing and which is inserted into a side opening of the flame element.

In some embodiments, each of the flame elements can be substantially three-dimensional.

In some embodiments, the circuitry is configured to communicate with sensors to detect movement of the flame elements. In those embodiments, when sufficient motion is detected the light sources can be affected.

The inventors additionally contemplate the implementation of additional light sources. For example, each of the first and second flame elements can have two or more associated light sources, or in different embodiments, the first and second flame elements can have different numbers of associated light sources (e.g., two for the first flame element and one for the second flame element, or three for the first flame element and two for the second flame element).

Some embodiments include multiple light sources to illuminate each of the flame elements. For example, in some embodiments, each flame element has three or more associated light sources that collectively illuminate that flame element. Alternatively, one or more of the light sources could be used to illuminate two or more flame elements by diverting some of the light to each flame element. Utilizing multiple light sources per flame element can each produce differently colored light (or the same colored light), which, when projected onto a flame element, overlaps in such a way as to produce a more convincing flame effect. When a flame element has multiple associated light sources, those light sources all project light upward from inside the enclosure through a single aperture and onto the flame element. In still other embodiments, some flame elements have multiple associated light sources while others have only single associated light sources.

In preferred embodiments, lighting effects can be coordinated between both flame elements and light sources. For example, the light projected to each light source can dim sequentially to create a wave-like effect that moves around the electric candle. In embodiments having multiple colored light sources per flame element, different colors can be projected onto different flame elements in or out of sequence. The lights can also dim simultaneously, or even change color simultaneously. Any combination of light changing or dimming is contemplated.

In some embodiments, the program is stored to a memory of the circuitry (e.g., a hard drive, flash memory, or some other form of data storage). The program can include a plurality of profiles that each causes the light sources to project light differently. Depending on the profile implemented, different signals can be sent to one or all of the light sources. For example, in one profile, movement of a flame element can cause the associate light source(s) to turn off, while in another profile, movement of the flame element only causes the light source(s) to dim, but not turn off. Profiles can also cause the light source(s) to project light at different intensities and in different colors according to a predetermined pattern, or even according to a randomly generated sequence.

For example, a third flame element with a corresponding third light source can be implemented. The third flame element and third light source will function substantially similarly to the first and second flame elements and light sources, respectively. The enclosure of those embodiments having a third flame element also include a third associated aperture, and the circuitry is designed to manage the third flame element and its associated light source. In some embodiments, the third flame element can also have multiple associated light sources.

In some embodiments, the program stored to the circuitry causes the first and second light sources to project light onto the first and second flame elements, respectively, according to a time-based sequence. For example, if a candle is used at night, it can produce either brighter or dimmer light. In other embodiments, the program causes the first and second light sources to project light onto the first and second according to a location-based sequence. For example, if a candle is used in a home, if it is in a bathroom it can project a first light color, but if it is in a dining room, it can project a second light color.

Some embodiments of the candle additionally include a light sensor. The light sensor can be used to detect a light sensor coupled to the circuitry, wherein the circuitry can adjust output from the first and second light sources based on data from the light sensor. For example, if a candle is used in a dim room, it can adjust the intensity of the light (to make it either brighter or dimmer) using information from the light sensor indicating the room is dim.

Another aspect of the inventive subject matter includes a multi-flame electric candle similar to the candle described above except the circuitry coordinates the movement of the flame elements rather than the light sources.

In some embodiments, the flame elements can have a master-slave configuration where the first flame element is a master element, the second and third flame elements are slave flame elements, and the circuitry primarily coordinates movement of the master flame element resulting in movement of the slave flame elements. For example, when the circuitry causes movement in the first flame element (the master flame element), the program stored to the circuitry can generate corresponding movements in the second and third flame elements (slave flame element), where the movements are based on the movement in the first flame element rather than being pre-determined movements stored to the program.

In some embodiments, the program includes multiple profiles that each cause the first and second flame elements to move differently based on the profile that is selected. In other embodiments, the circuitry coordinates projection of light from the first and second light sources with movement of the first and second flame elements, respectively. In other words, when the program stored to the circuitry causes the flame elements to move, the induced movement is accompanied by a variation in projection of light from the respective light sources. For example, if a flame element is caused to make a dramatic movement, the corresponding light source (or in some embodiments, light sources) will produce a corresponding change in intensity to make it appear as if a flame is flickering in a breeze.

BRIEF DESCRIPTION OF THE DRAWING

FIG. 1A-1C show different views of an electric candle having three flame elements all facing the same direction and in a triangle arrangement.

FIGS. 2A-2C show different views of an electric candle having three flame elements all facing the same direction and in a linear arrangement.

FIG. 3A-3C show different views of an electric candle having three flame elements all facing the same direction and in a linear arrangement, where the top surface of the electric candle slopes.

FIG. 5A shows a flame element, three lenses, and three light sources, one for each lens.

FIG. 5B shows an electric candle using the components shown in FIG. 5A.

FIG. 6 shows an embodiment of a remote control.

FIGS. 8-1 to 8-4 show a circuit diagram of the circuitry for an embodiment of an electric candle.

FIGS. 9-1 to 9-4 show a circuit diagram of the circuitry for a different embodiment of an electric candle.

DETAILED DESCRIPTION

Figure 3B:
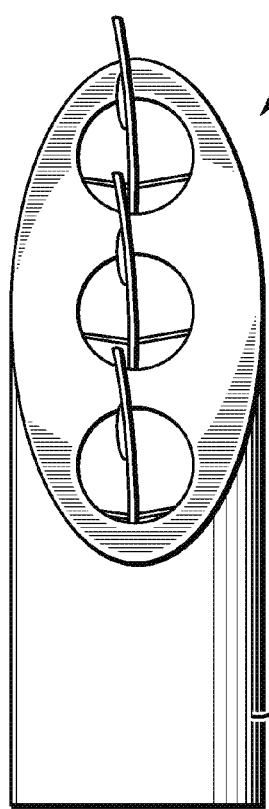

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The device described in this application is an electric lighting device in the form of a candle. A number of features differentiate this device from devices described in the prior art. Devices of the inventive subject matter have five main components: (1) an enclosure, (2) multiple flame elements, (3) multiple light sources, (4) a drive mechanism, a motion sensor, or both, (5) a controller.

The enclosure is the shell of the electric candle. It houses all the electric and mechanical components necessary for the electric candle to function properly. The interior of the enclosure can be formed to hold various components in place, as needed. The enclosure can be manufactured by injection molding or by any other method known in the art for the formation of plastic components. It can be formed as two pieces that are later joined, or it can be formed as a single component.

While the enclosure must satisfy functional requirements, it can optionally be formed to have various aesthetic features. For example, the plastic used to form the enclosure can be colored. Alternatively, the enclosure can be covered in a wax or wax-like material to better simulate the feel of a real candle. The wax or wax-like coating can also be colored or have multiple colors. In addition, the wax or wax-like material can be scented.

Figure 3C:
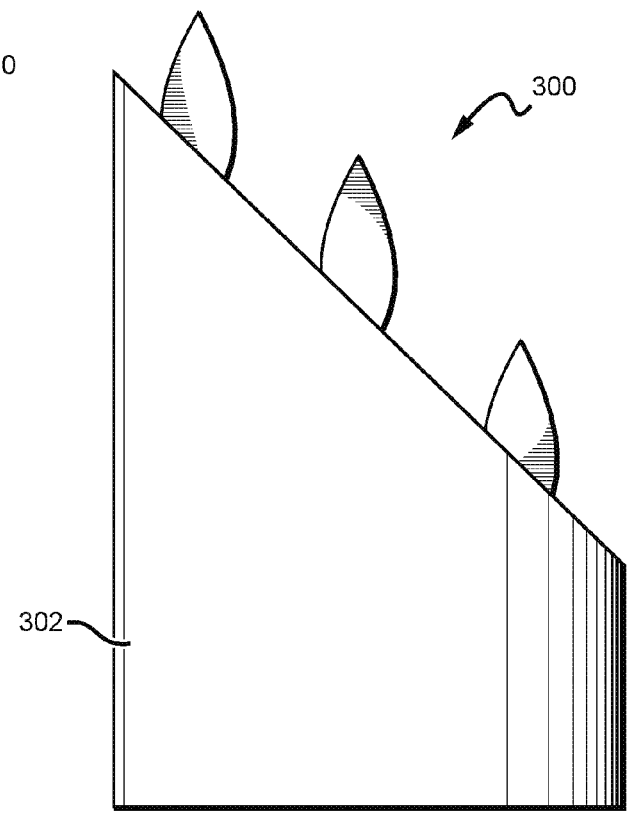
Figures 1, 8:
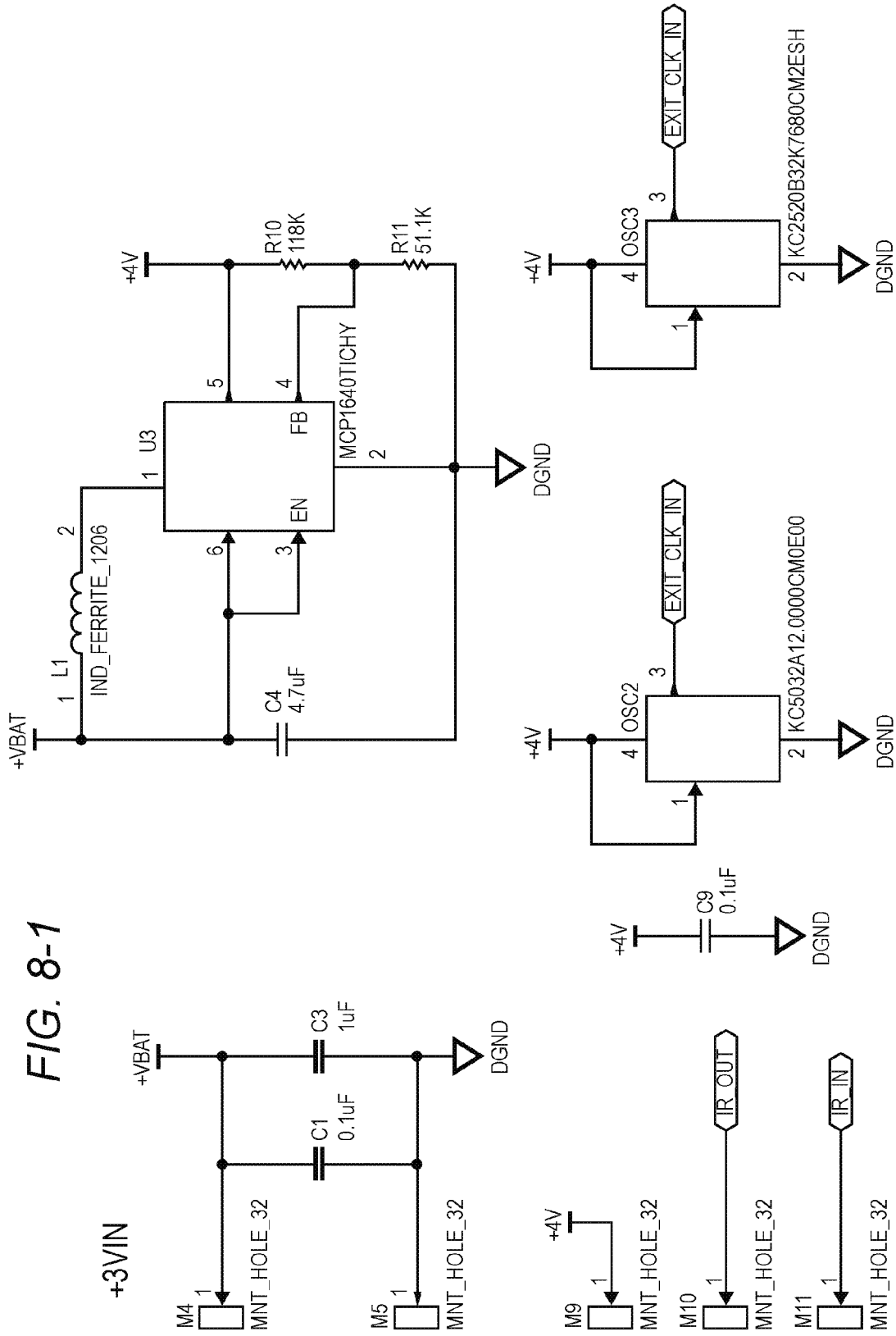
Figures 3, 8:
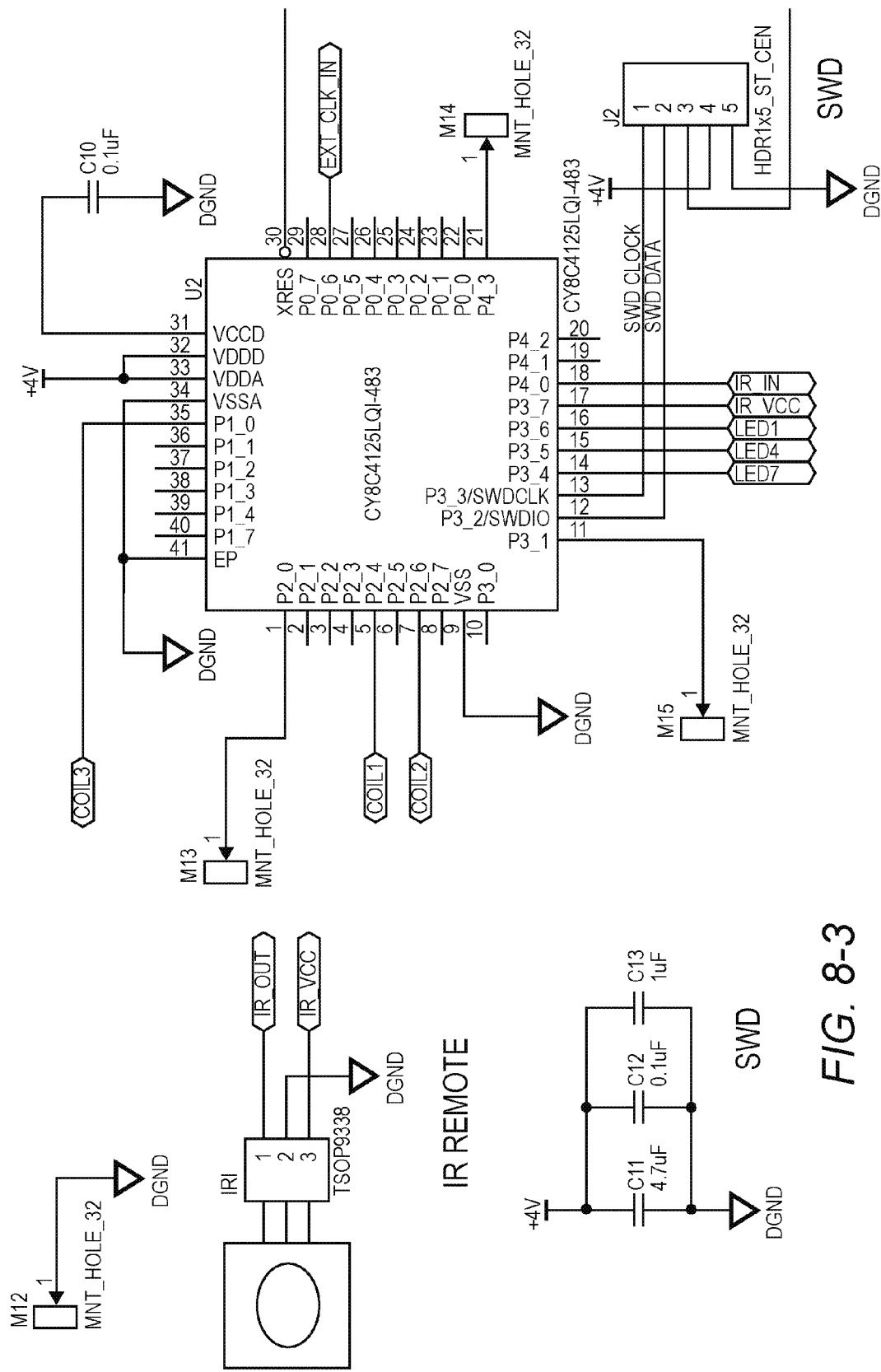
Figures 4, 8:
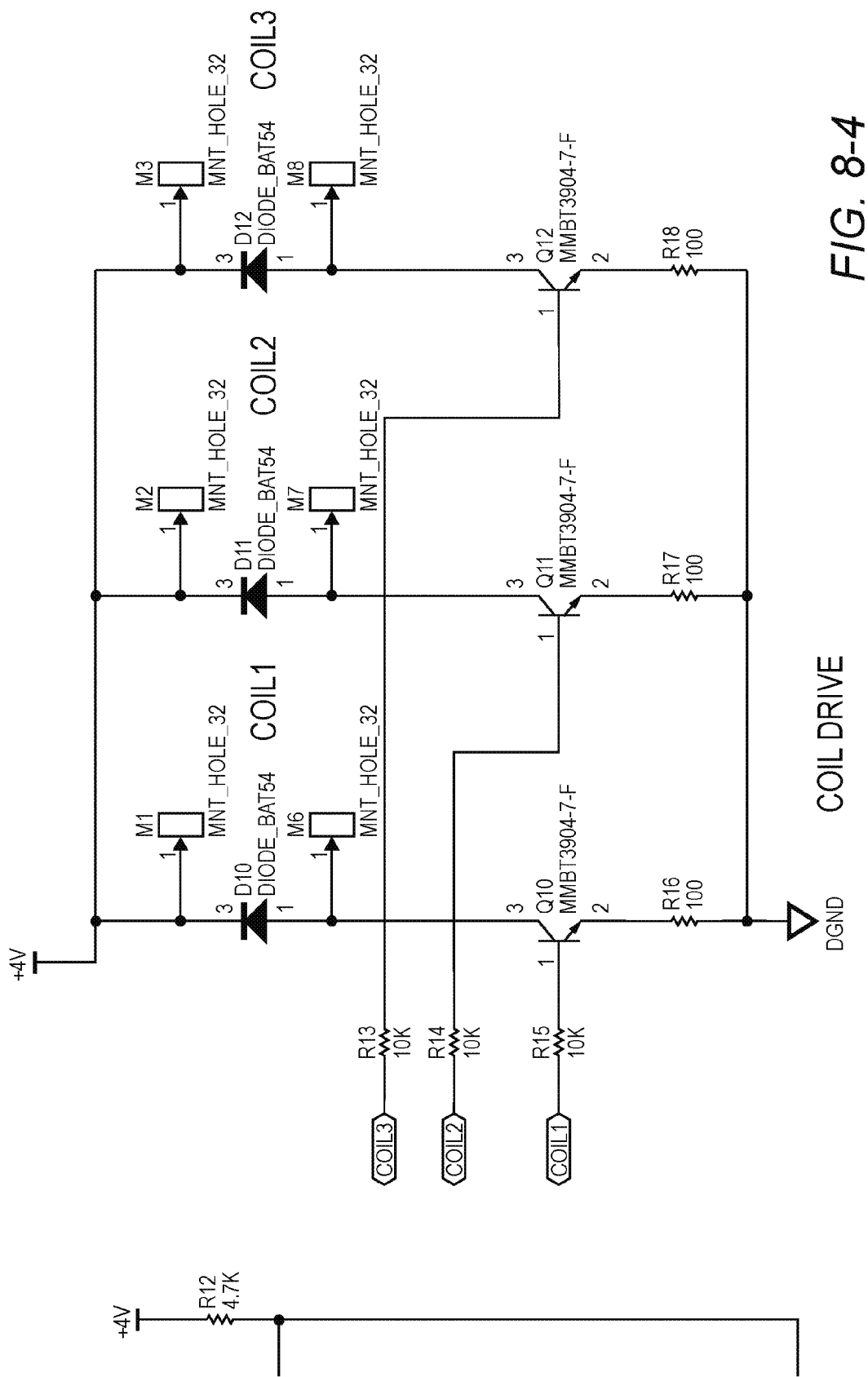
Figures 1, 9:
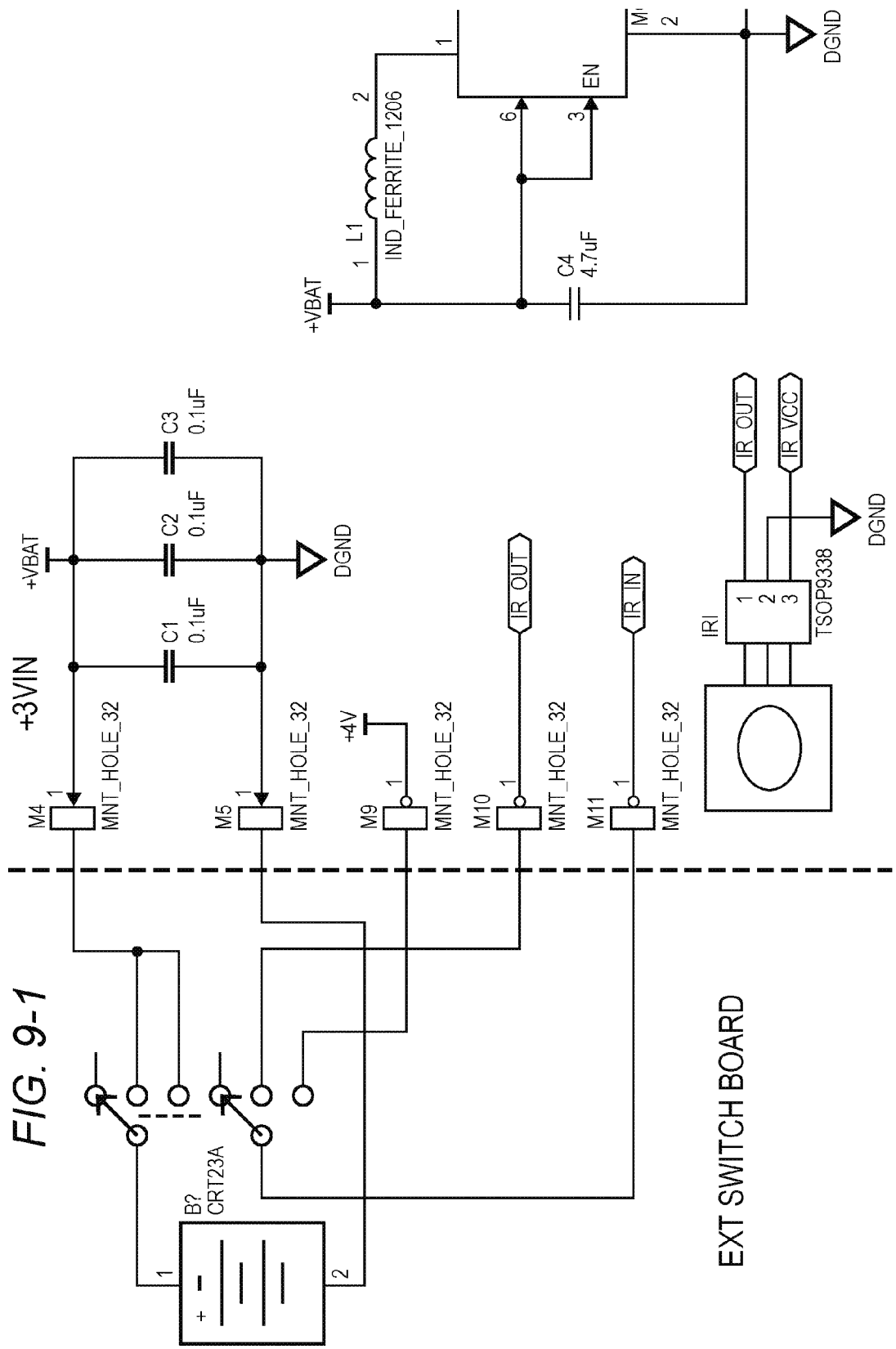
Figures 2, 9:
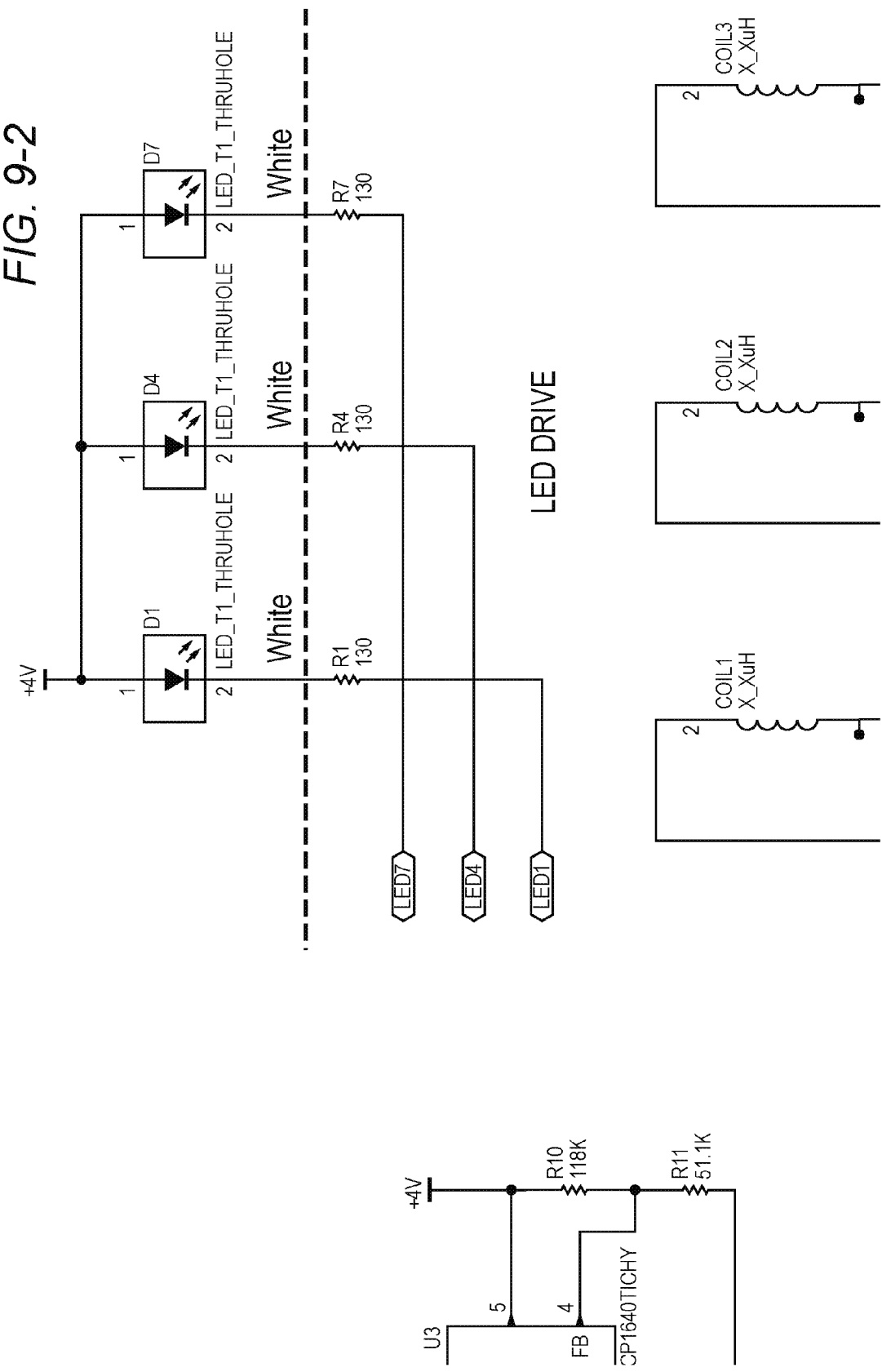
Figures 3, 9:
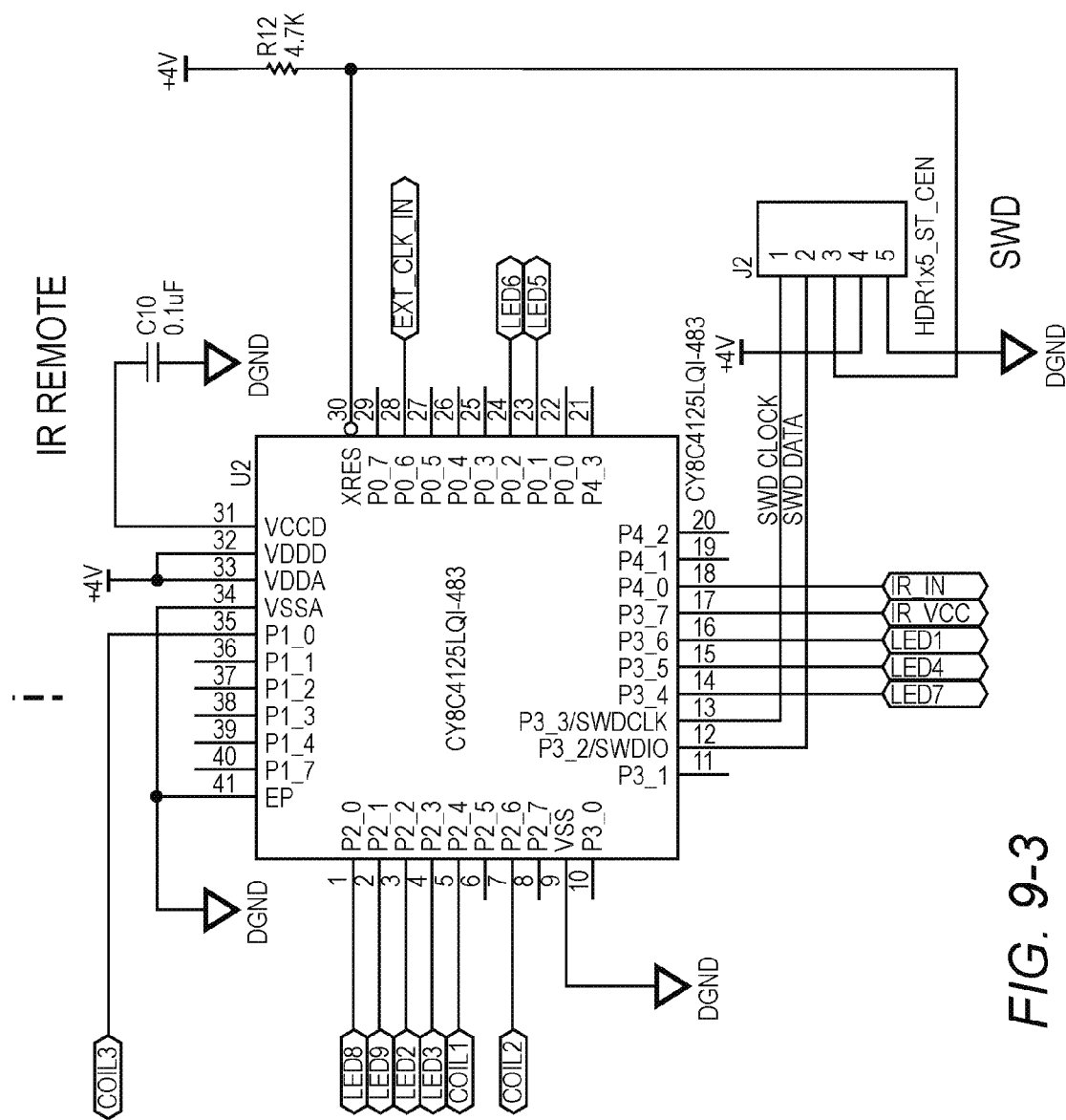
Figures 4, 9:
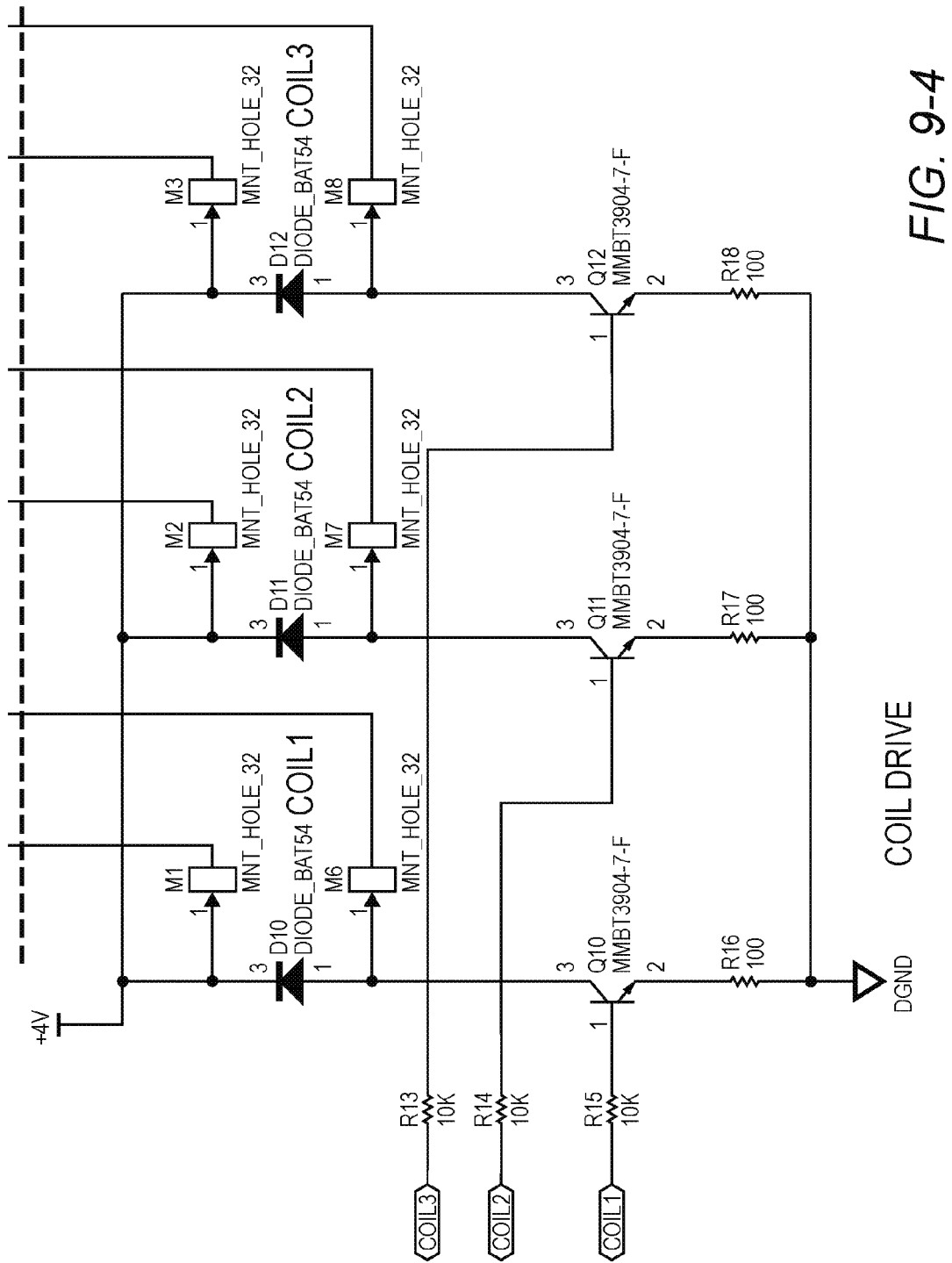

The shape of the enclosure can vary, as well. It can take on a substantially cylindrical shape, or it can be formed into a triangle, a square, or any other shape. FIGS. 1A-1C show an electric candle 100 where the enclosure 102 is shaped as a cylinder, FIGS. 2A-2C show an electric candle 200 where the enclosure 202 is shaped as an ellipse having a flat top, and FIGS. 3A-3C show an electric candle 300 where the enclosure 302 is shaped as an ellipse having a slanted top.

Critically, the top of the enclosure 104 can have multiple apertures 106, or holes. The apertures can be circular, or take on any other appropriate shape. Most importantly, the apertures 106 are sized to allow light to pass outwardly from light sources (shown in FIG. 4) within the enclosure to one or more of the flame elements 108. The apertures must also be sized for flame elements 108 to protrude from the enclosure. Flame elements 108 are suspended near the apertures so that they can move (e.g., rotate or pivot) in a way that mimics real flame movement. Also note the direction that each element faces. In preferred embodiments, shown in FIG. 11A, each of the flame elements can face toward the nearest side or wall of the enclosure.

The interior of the enclosure 102 provides space for a drive mechanism (or mechanisms), a motion sensor (or sensors), a PCB having circuitry to control the electric candle 100 and any other necessary components such as a battery. Finally, the bottom portion of the enclosure can have an access panel that can be attached via screw or latching fastener (such as a buckle-type component).

Various drive mechanisms to cause movement in the flame elements are contemplated. In some embodiments, the electric candles use one or more electromagnetic coils to generate one or more magnetic fields. The generated magnetic field(s) interact with permanent magnets attached to the bottoms of the flame elements, causing them to move. In other embodiments, a fan is used to either push air upward and out of the enclosure, or to pull air downward and into the enclosure. Air passing by the flame elements results in movement.

In configurations taking advantage of magnetic effects, there can be one large electromagnetic coil, or there can be multiple smaller coils. The number of coils does not need to coincide with the number of flame elements. For example, one configuration could include two electromagnetic coils and three flame elements, and by varying the amount of current passing through each coil, the generated magnetic fields are caused to overlap to varying degrees. This interaction can cause each of the flame elements to move as if controlled independently. In another example, four electromagnetic coils can be used with three flame elements. The electromagnetic coils do not need to be placed directly underneath the flame elements, and can instead be placed in any pattern or configuration within the enclosure as long as the magnetic fields from the electromagnetic coils can interact meaningfully with permanent magnets attached to the flame elements.

In addition to varying the number of electromagnetic coils, the coils can vary in size, shape, or number of windings, and additionally the permanent magnets on the flame elements can vary in size. Varying the sizes of each component can bring about desirable results in terms of flame element movement. For example, larger magnets exhibit stronger magnetic fields, which could reduce the requirements of an electromagnetic coil needed to create a magnetic field sufficient to interact with the larger magnet.

In other configurations, fan power is used to cause movement in the flame elements. There can be one or more fans within the enclosure without departing from the inventive concepts described in this application. In a configuration having a single fan, the fan would be larger bring about a higher mass flow rate of air through the enclosure. The interaction of moving air with the flame elements is what causes movement to simulate a candle flame. In a configuration having multiple fans, there could be one fan per flame element, with the fans situated below the flame elements facing upward, or with the fans along the outside of the enclosure facing inward toward the bottom of the flame elements. In these configurations, each individual fan causes a particular flame element to move, but it is additionally contemplated that the fans can interact with other flame elements.

In some versions of the electric candle, a drive mechanism situated below the flame elements within the enclosure causes the flame elements to move. The drive mechanism can include one or more electromagnetic coils that generate a magnetic field when current passes through them. The magnets in the lower portion of the flame elements interact with the generated magnetic field causing all of the flame elements to move. Movement of the flame elements mimics the flickering of candle flames.

Figure 4:
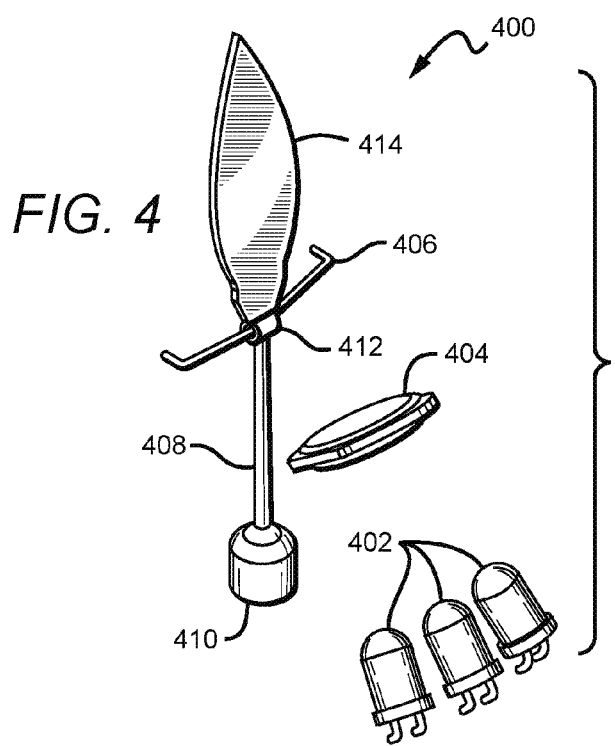
FIG. 4 shows a flame element, a lens, and three light sources that all shine through the same lens.

An example flame element 400 for electric candles of the inventive subject matter is shown in FIG. 4. The flame element 400 has four main portions: a top portion 414, a mounting portion 412, a middle portion 408, and a lower portion 410.

The top portion 414 is generally shaped to mimic the look of a flame. It can be substantially flat, or it can take on a more three-dimensional shape. FIG. 4 shows a top portion 414 with a substantially flat configuration. In configurations where the top portion 414 is more three-dimensional, it can have different shaped cross sections (e.g., triangular, circular, elliptical, rectangular).

The mounting portion 412 includes a through hole that runs approximately the same direction as the width of the top portion 414. In this way, light is able to reach the top portion 414 without interference from a support wire 406. The support wire suspends the flame element within an aperture of an enclosure so that the flame element 400 protrudes outward from the top of the enclosure (as shown in, for example, FIGS. 1A-1C). When mounted, the top portion 414 of the flame element 400 looks like a candle flame coming from the top of a candle.

The middle portion 408 is long and slender, though other configuration can be implemented without departing from the inventive subject matter. It provides distance between the lower portion 410 and the top portion 414 such that, at rest, the flame element remains upright. To achieve this, it is important that the center of mass for the flame element 400 is located slightly below the mounting portion 412. Having the center of mass only slightly below the mounting portion 412 makes the flame element 400 easily movable. The farther the center of mass is from the mounting portion 412, the more difficult it will be to cause the flame element to move. In some electric candles, it is desirable to have the flame element 400 easily moved, while in others it is more desirable to make the flame element 400 difficult to move.

Finally, the lower portion 410 acts as a counter weight to the top portion 414. It can additionally include a magnet to facilitate movement of the flame element 400 by a drive mechanism [ref]. The magnet can have different sizes and different strengths depending on what is required for a particular implementation of the inventive subject matter.

As mentioned above, electric candles of the inventive subject matter include multiple flame elements (shown in FIGS. 1A-1C, 2A-2C, 3A-3C, and 5B). The flame elements need not all be identical. They can be sized and shaped differently from one another, and they can be oriented differently from one another as well. Electric candles can include 1, 2, 3, or more flame elements.

To create a convincing illusion of real candle flames, light sources must illuminate the flame elements. FIG. 4 shows three light sources 402 that shine light upward toward flame element 400. A lens 404 lies between the light sources 402, and the lens 404 focuses light from the light sources 402 onto the top portion 414 of the flame element 400. Different focal lengths can produce different effects. For example, the lens 404 can cause light from the light sources 402 to focus directly onto the upper portion 414, or the lens 404 can cause light from the light sources 402 to reach the upper portion 414 while it is still out of focus (e.g., the focal length of the lens 404 is either longer or shorter than the distance from the lens 404 to the upper portion 414).

In FIG. 4, three light sources 402 each shine through a single lens 404. Light sources 402 can be LEDs (shown in FIG. 4), but in other versions of the electric candle the light sources 402 can be fiber optic cables, incandescent bulbs, glowing components, or any other light source now known in the art. A configuration using a single lens 404 is only one of many possible configurations that do not depart from the inventive subject matter described in this application. For example, in FIG. 5A, each light source 502, 504, and 506 has its own associated lens 508, 510, and 512, respectively. Each light source 502, 504, and 506 can then be positioned around the flame element 514 so that a different portion of the flame element 514 is lit by each light source 502, 504, and 506. In another configuration, the light sources can be in a stacked configuration, rather than the lateral configuration shown in FIG. 4 or the circular configuration of FIG. 5A. Light sources in a stacked configuration can each have separate lenses, or they can have a single lens.

Light sources used in the electric candle can each have different colors. Preferably, in a configuration having three light sources, one would be orange, one would be blue, and another would be yellow. These colors are preferable because they help to produce a more convincing flame effect when projected onto a flame element together.

Light projected from the light sources 402 can reach the upper portion 414 in a variety of ways to better mimic a real candle flame. For example, each light source 402 could be oriented slightly differently so that its light reaches a different region of the upper portion 414. In this way, a yellow light could reach the top area of the upper portion 414, an orange light could reach the middle area of the upper portion 414, and a blue light could reach the lower area of the upper portion 414. Projecting the different colors in this way makes the upper portion 414 appear more like a real candle flame. Alternatively, the light from each of the light sources 402 can be projected to different regions of the upper portion, where each region overlaps with the others.

In different versions, each flame element has an associated coil below it in the enclosure. Each coil interacts with only the flame element above it, allowing for more nuanced control of the movement of the different flame elements. When electricity is passed through a coil, it creates a magnetic field, which interacts with the magnet in the lower portion of the flame element above the coil.

Other mechanisms can be implemented to cause movement in the flame elements. For example, a fan can be placed within the enclosure so that it either pushes or pulls air past the flame elements, causing them to move. Regardless of the method of causing the flame elements to move, the most preferred versions of the electric candle having control over flame element movement include independent movement control for each flame element.

In other version of the electric candle, movement control is replaced with movement detection. Movement sensing can be used to implement different lighting effects. For example, if the flame elements are caused to move by a breeze, the sensors will detect such movement and the program will cause the light sources to turn off or change some other characteristic of the light source. In preferred embodiments, small perturbations in the flame elements will cause the light sources to flicker, while more dramatic movements in the flame elements will cause the light sources to turn off, effectively simulating a real candle.

For example, Hall Effect sensors can be placed to detect movement of one or more of the flame elements, and information related to that movement can be interpreted by a program stored to the circuitry. Using that information, a program, via the circuitry, can cause the light sources to vary in intensity or color, for example, which creates a more convincing illusion of a real flame. In other embodiments, different motion sensors can be implemented. For example, a light-based motion sensor such as an infrared sensor can be implemented. It is preferable for the sensor to detect varying degrees of movement, rather than just a binary indication of movement.

One type of movement sensor contemplated is a magnetic sensor, such as a Hall Effect sensor. Magnetic sensors produce a voltage proportional to the applied magnetic field and also sense polarity. To operate with Hall Effect sensors, the flame elements can be made the same as in versions of the electric candle having movement control. The only difference would be the mechanism below the flame elements would be the sensors instead of electromagnetic coils. Other sensor types can also be used. For example, an optical sensor can be used to detect whether the flame element has moved.

Magnetic sensors can detect movement of a magnet relative to the sensor. So, when the magnet at the bottom of a flame element moves relative to the sensor, the sensor can detect the degree of movement (e.g., it can detect the distance of the magnet from the sensor, and some configurations can event detect which direction the magnet moved).

In these versions of the electric candle, internal components do not cause the flame elements to move at all, instead the flame elements rely on external forces to cause movement—similar to real candles.

Among other sensors that can be included with electric candles described in this application are light sensors. A light sensor can sense light within the visual spectrum. In different versions of the electric candle, an infrared sensor can alternatively be included. The purpose of sensors that detect electromagnetic waves is to allow for the candles to, for example, project dimmer light in areas with low light, or vice versa. These sensors can enable the candles to be turned on or off with a wave, or with another type or sequence of gestures.

Tying together all the hardware components discussed above is electronic circuitry storing software to operate the electric candles. The circuitry can be configured to interact with any version of the electric candle discussed above (e.g., versions having movement sensors, versions having multiple LEDs per light, versions having electromagnetic coils, etc.). Some examples of the circuitry used with electric candles contemplated in this application are shown in FIGS. 8-1 through 8-4 and FIGS. 9-1 through 9-4.

The circuitry can be implemented on a printed circuit board (PCB), and each version of the electric candle will have a corresponding circuitry. All versions of the circuitry will include some form of memory to store rudimentary software (this application will refer to the software as a "program") to operate its associated electric candle.

Programs stored to the circuitry must be configured to interact with the specific hardware configuration of the electric candle it is associated with. For example, in an electric candle having one light source per flame element, where the flame elements are caused to move by electromagnetic coils, the program will be configured to operate each component of the electric candle.

The types of programs can be broken down into three different categories: (1) programs that primarily coordinate the light sources, (2) programs that primarily coordinate movement of the flame elements, and (3) programs that coordinate the light sources with movement of the flame elements.

In versions of the program that primarily coordinate the light sources, the flame elements are caused to move by external forces. Electric candles like these are described above to include movement sensors. The program is accordingly capable of receiving feedback from the motion sensors via the circuitry and then using that information to coordinate projection of light from the light sources. For example, if a flame element is caused to move only slightly, the program could cause the corresponding light source to briefly dim the light projected to that flame element. This would create an effect of a candle flame briefly dimming when a breeze passes by.

In the same way, this dimming effect can be more exaggerated based on the degree of movement of a flame element. The more a flame element moves (e.g., by a breeze, or by someone blowing on the candle), the dimmer the program will make the light from a corresponding light source. In another example, if a movement of a flame element is strong enough, the corresponding light source will completely turn off, similar to a real candle when it encounters a sufficiently strong breeze.

The program can also cause the light sources associated with each flame element to change or flicker based on a random or pseudo-random waveform, regardless of whether an external force causes the flame elements to move. Alternatively, a waveform to cause movement can be procedurally generated.

In versions of the electric candle where interaction with a magnetic field from a single electromagnetic coil causes the flame elements to move, the program primarily coordinates movement of the flame elements by controlling current flow to the electromagnetic coils. By controlling the flow of current through a coil, the program controls movement of the flame elements above that coil. The program can provide regular pulses according to a waveform, or it can produce random, or even pseudo-random, pulses. In some versions, the program activates the coil based on a procedurally generated waveform.

In other versions where each flame element has its own corresponding electromagnetic coil, the program can independently control the provision of current to the coils. In this way, movement of the flame elements can be coordinated. One possible coordination would be to provide a waveform to a first coil, and then have the same waveform applied to each successive coil based on a time delay. Another possible coordination would be to include master and slave flame elements. One flame element would serve as a master, and each other flame element in the electric candle would be considered a slave element. The program could include a waveform, pattern, or sequence for the master flame element, and then each slave element would be caused to move based on the movement of the master flame element.

The same master and slave configuration can apply equally to electric candles having motion sensors, where the program primarily coordinates operation of the light sources. If a master flame element is detected to move, but the slave flame elements do not detect movement, then the program can, for example, change the intensity of the light projected to the master flame element as well as the light projected to the slave flame element(s).

In any configuration having a master and slave flame element, the master flame element can be dynamically assigned. For example, if movement is detected in only one flame element, as in the scenario described in the paragraph above, the master flame element would be designated as whichever flame element is detected to be the sole moving flame element.

In versions of the electric candle having multiple light sources per flame element, where each light source is a different color, the program can vary the intensity of each light individually. For example, when a real candle flame encounters a slight breeze, the flame is affected (e.g., it becomes brighter, it has more blue, more yellow, more orange, or flickers more intensely). The program can interpret movement from a movement sensor associated with a flame element and can cause one or all of the light sources to project more or less intensely to give the illusion of a color change, an intensity change, or to cause a flickering effect.

Finally, some programs can coordinate both the movement of the flame elements and operation of the light sources. For example, a program could simultaneously cause a movement in the flame element by allowing current to pass through an associated coil, while at the same time causing the associated light source(s) to vary in intensity. This could result in a flicker, a dimming, a change in color, or any other effect resulting from a variation in color or intensity of light from the light source(s). A program could control however many flame elements and associated light sources are included in a particular electric candle (e.g., 2, 3, 4, 5, 6, or more).

A program, regardless of the version of the electric candle it is associated with, can include different profiles. Each profile can essentially include distinct operating instructions for the electric candle. For example, one profile could be for restaurants, one could be for a bedroom, one could be for the living room, one could be for a home dining room, etc. A profile for restaurants might cause the light sources to project dimmer light to enhance a dining experience, while a profile for a home dining room could cause the light sources to project brighter light since a home dining room might rely more heavily on light from the electric candle than a restaurant would. A bedroom profile could have increased movement in the flame elements or increased flickering of the lights.

To give a user control over the electric candles described in this application, a remote control can be used. FIG. 6 shows one possible remote control 600. It includes a button to set the candle 602, a button to enter the candle setting 604, and a plurality of buttons to select a profile 606.

The remote control 600 can be used to control many aspects of electric candles of the inventive subject matter. Using a remote control 600, a user can control one or many electric candles, either individually or as a group. A remote control 600 can be used to select different programs or user profiles. A remote control can also enable a user to provide a new program or to create a new user profile for a candle or a set of candles, where the program is created using the remote, or transmitted to a candle or candles via the remote. More specifically, a user can cause a candle to express different colors, to express different color patterns and sequences, to express different brightnesses, to express different dimming patterns and sequences, to express different patterns and sequences of movement in the flame elements, and so forth. Ultimately, the remote control 600 can be configured to provide control over any customizable aspect of an associated electric candle, or a set of associated electric candles.

Remote controls 600 can communicate with the electric candles in any way currently known in the art. For example, a remote control 600 can communicate with electric candles via wifi by connecting to the same local area network. A remote control 600 can alternatively communicate with candles via Bluetooth, NFC, infrared, and so forth.

To enable a remote control to operate with an electric candle described in this application, the electric candle's circuitry must additionally include a mode of receiving information from the remote, such as an IR sensor, or a wireless receiver (or transceiver). For an application on a computing device to operate with electric candles described in this application, the circuitry must include a form of wireless communication (e.g., a Bluetooth connection, a wifi connection, an NFC connection, or any other form of wireless connection now known in the art).

Figure 7C:
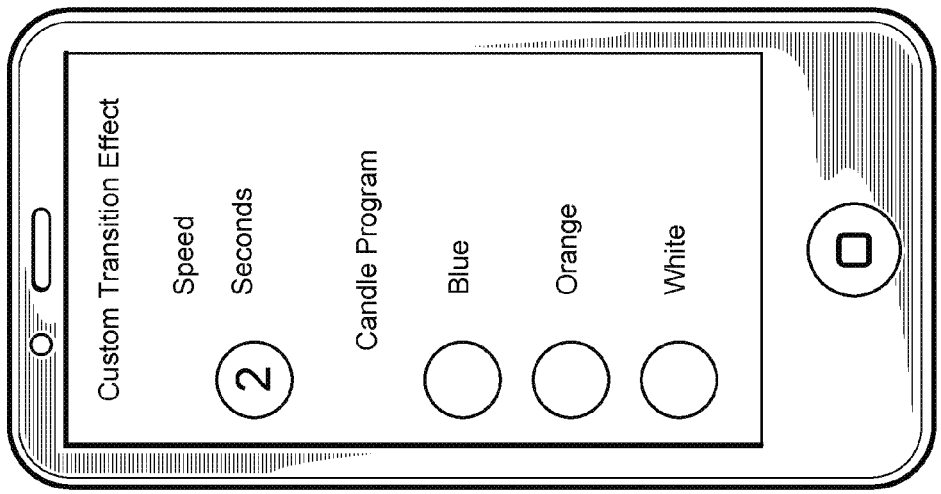
FIG. 7A-7C show three views of a GUI for a mobile application.
Figure 7B:
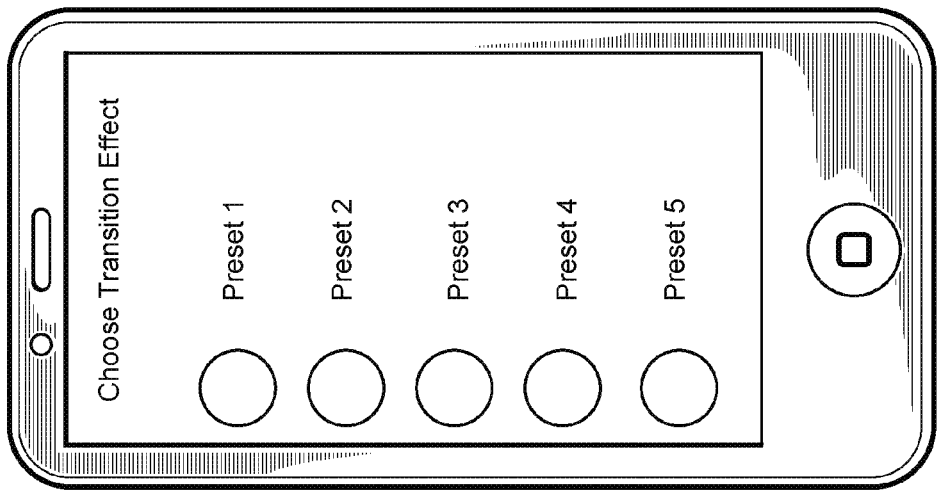
Figure 7A:
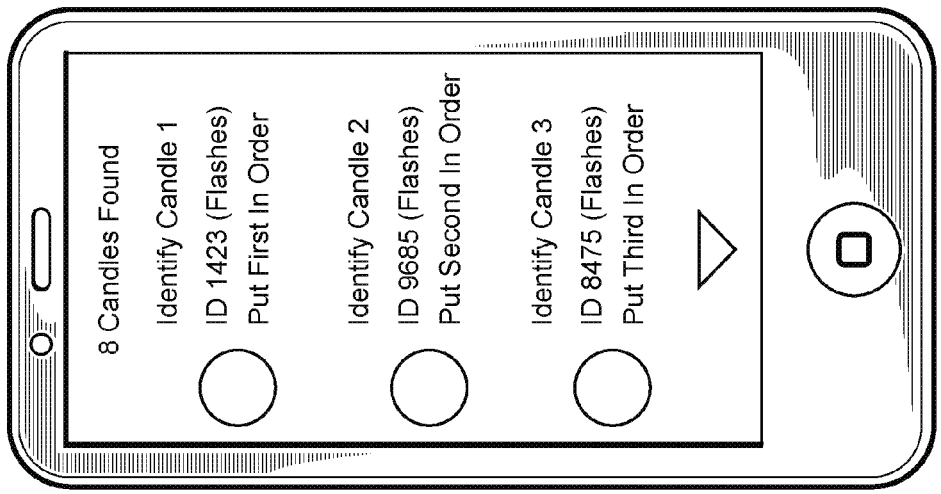

Alternatively, a user could install an application to a computing device, as shown in FIGS. 7A-7C. The application allows a computing device 700, such as a cell phone, a tablet, or a computer, to select and control electric candles. FIG. 7A shows a GUI allowing a user to select which candles to control; FIG. 7B shows a GUI allowing a user to select a "preset" (e.g., a profile); and FIG. 7C shows a GUI allowing a user to set a custom speed, and a custom color. An application can be configured to allow additional customization, such as setting a timer for operating, queuing profiles to operate in sequence based on blocks of time.

The application shown in FIGS. 7A-7C can perform all of the functions described above with respect to the remote control in FIG. 6. In addition, a software application can provide more robust control for sets of candles. A GUI can enable a user to put candles into different groups, so that each group can be controlled together. For example, a dining room candle group may be brighter and flicker less than a bathroom candle group.

Figure 10:
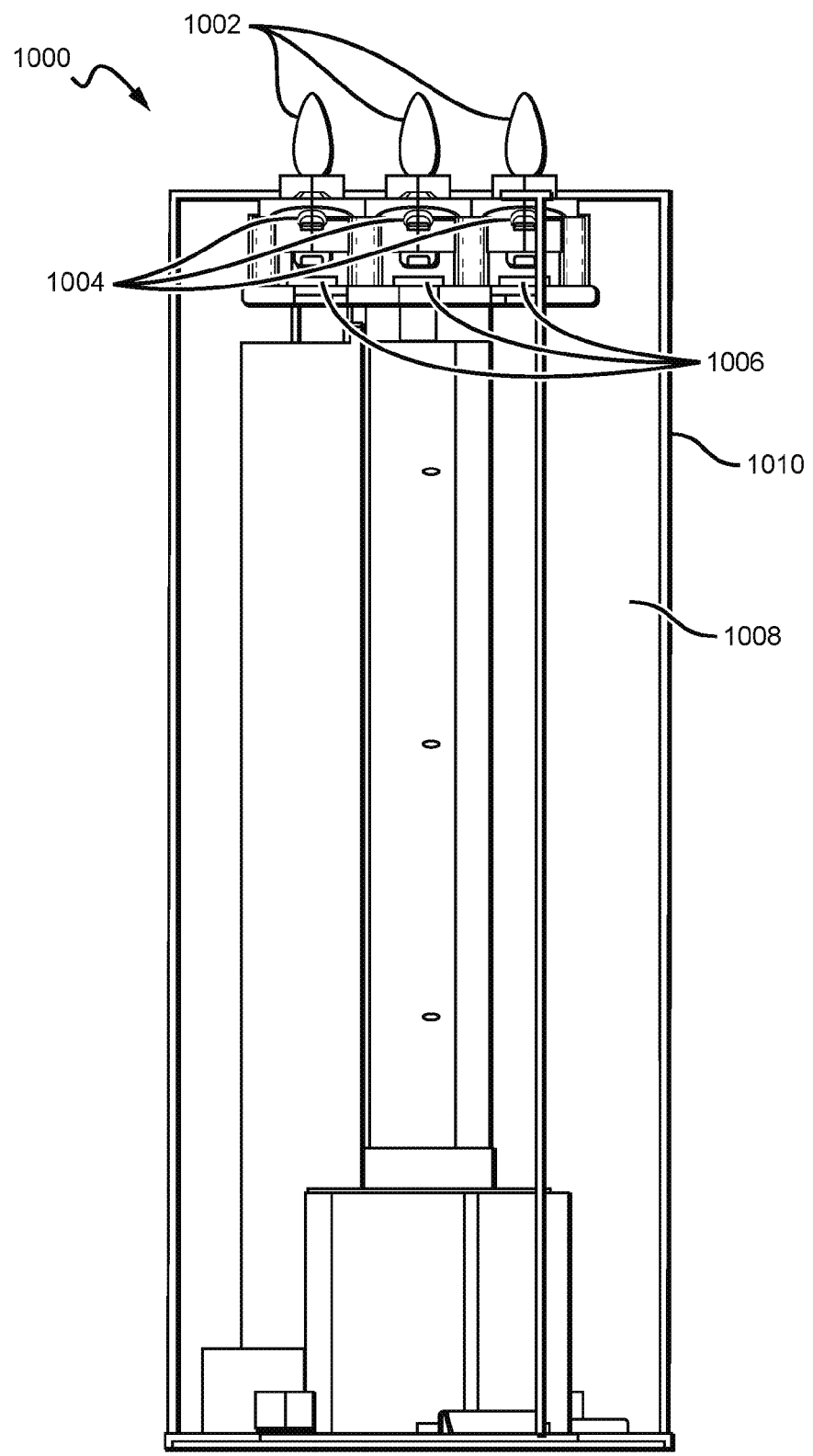
FIG. 10 shows an electric candle and some of its internal components.

FIG. 10 shows a fully assembled electric candle 1000 having three flame elements 1002. Each flame element 1002 is caused to move by an electromagnetic coil 1006 as described above. This particular figure shows the lenses 1004 which focus the light from each light source onto the flame elements 1002. The enclosure 1010 provides interior space to house the various components discussed in detail above, but also including batteries and all other components required to operate the electric candle described in this application.

Figure 11A:
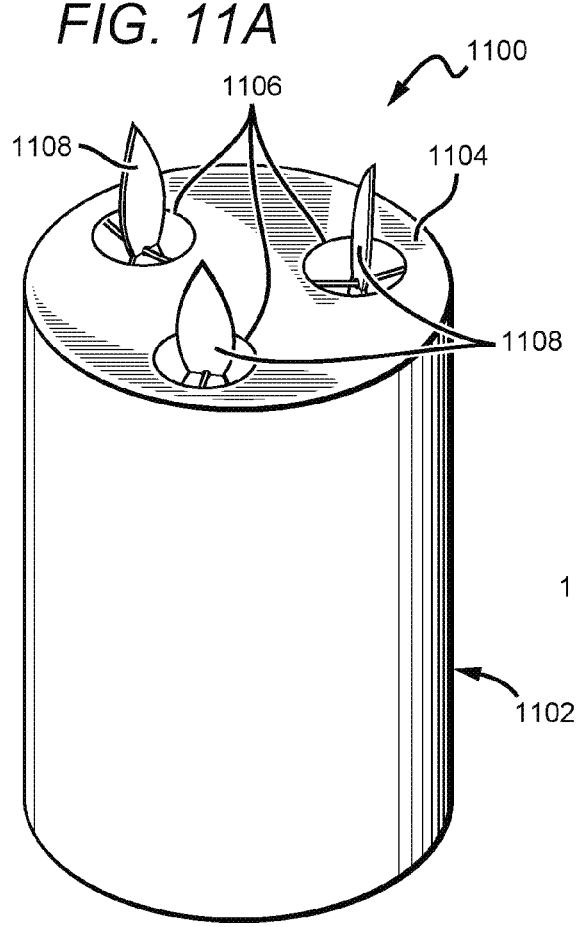
FIGS. 11A-11C shows another embodiment of an electric candle having three flame elements.
Figure 11B:
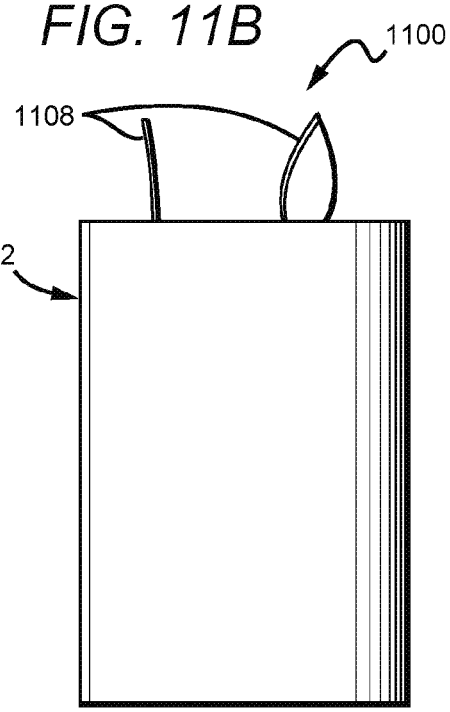
Figure 11C:
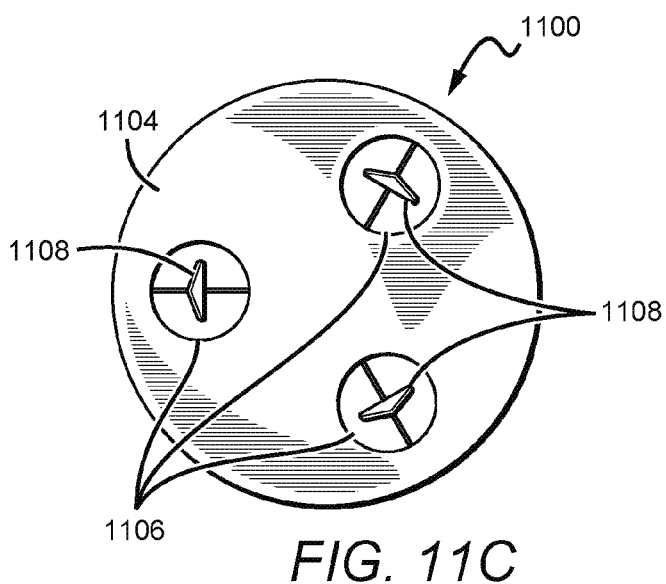

FIGS. 11A-11C shows an electric candle 1100 having three distinct flame elements 1108, each of which faces toward the nearest side or wall of the enclosure 1104. This advantageously allows the candle 1100 to produce the ideal flickering flame effect no matter which portion of the enclosure is closest to a viewer. In other embodiments, one or more of the flame elements can be disposed on a gimbal or other rotating support such that the face of the flame element can be reoriented over time, rather than just wobble or pivot as allowed in the standard mounting configuration described above.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A multi-flame electric candle comprising:
   an enclosure having first and second apertures on a top surface;
   first and second artificial flame elements protruding through the first and second apertures, and coupled to the enclosure such that each of the first and second artificial frame elements may move with respect to the enclosure;
   first and second light sources positioned and oriented within the enclosure to project light onto the first and second artificial frame elements through the first and second apertures, respectively;
   circuitry to coordinate light projection from the first and second light sources, wherein the circuitry causes the first and second light sources to project light according to a program stored to the circuitry; and
   wherein the circuitry comprises a circuit to sense a movement in each of the first and second artificial frame elements.

2. The multi-flame electric candle of claim 1, wherein the circuit to sense movement is a Hall effect sensor.

3. The multi-flame electric candle of claim 1, wherein the program causes the first and second light sources to project light at varying intensities based on the sensed movement in the first and second artificial frame elements, respectively.

4. The multi-flame electric candle of claim 1, wherein the program causes the first light source to turn off upon sensing a sufficient movement of the first artificial flame element.

5. The multi-flame electric candle of claim 1 wherein the third light source projects light of a different color than the first light source onto the first artificial element, and fourth light source projects light of a different color than the second light source onto the second flame element.

6. The multi-flame electric candle of claim 5, further comprising fifth and sixth light sources positioned and oriented within the enclosure to project light onto the first and second artificial flame elements through the first and second apertures, respectively.

7. The multi-flame electric candle of claim 6, wherein the fifth light source projects light of a different color than the first and third light sources onto the first artificial flame element, and sixth light source projects light of a different color than the second and fourth light sources onto the second artificial frame element.

8. The multi-flame electric candle of claim 6, further comprising fifth and sixth light sources positioned and oriented within the enclosure to project light onto the first and second artificial frame elements through the first and second apertures, respectively, wherein the first, third, and fifth light sources are arranged around the first artificial flame element and the second, fourth, and sixth light sources are arranged around the second artificial flame element.

9. A multi-flame electric candle comprising:
   an enclosure having first and second apertures on a top surface;
   first and second artificial flame elements protruding through the first and second apertures, and coupled to the enclosure such that each of the first and second artificial flame elements may move with respect to the enclosure;
   first and second light sources positioned and oriented within the enclosure to project light onto the first and second artificial flame elements through the first and second apertures, respectively; and
   circuitry to coordinate movement of the first and second artificial flame elements, wherein the circuitry causes the first and second artificial flame elements to move according to a program stored to the circuitry.

10. The multi-flame electric candle of claim 9, wherein the first artificial flame element is a master element, the second and third artificial flame are slave artificial flames, and the circuitry primarily coordinates movement of the master artificial frame element resulting in movement of the slave artificial flame elements.

11. The multi-flame electric candle of claim 1, wherein the program comprises a plurality of profiles that each cause the first and second artificial flame elements to move differently according to a selected profile.

12. The multi-flame electric candle of claim 1, wherein the circuitry is further configured to coordinate projection of light from the first and second light sources with movement of the first and second artificial flame elements, respectively.

13. A multi-flame electric candle comprising:
   an enclosure having first and second apertures on a top surface;

first and second artificial flame elements protruding through the first and second apertures, and couple to the enclosure such that each of the first and second artificial flame elements may move with respect to the enclosure;

first and second light sources positioned and oriented within the enclosure to project light onto the first and second artificial flame elements through the first and second apertures, respectively; and circuitry to coordinate movement of the first and second artificial flame elements with the projection of light from the first and second light sources, respectively, according to a program stored to the circuitry.

* * * * *